United States Patent [19]

Cobb et al.

[11] E Re. 31,164

[45] Reissued Mar. 1, 1983

[54] COOLING SYSTEM FOR ROCK RIPPER TIP

[75] Inventors: Delwin E. Cobb, Peoria, Ill.; Nathan Gutman, Simsbury, Conn.; Richard E. Livesay, Peoria, Ill.

[73] Assignee: Caterpillar Tractor Co., Peoria, Ill.

[21] Appl. No.: 20,888

[22] Filed: Mar. 15, 1979

Related U.S. Patent Documents

Reissue of:

[64] Patent No.: 4,070,064
Issued: Jan. 24, 1978
Appl. No.: 693,066
Filed: Jun. 4, 1976

[51] Int. Cl.[3] ..... E02F 5/02

[52] U.S. Cl. ..... 299/81; 111/7; 172/699; 299/36

[58] Field of Search ..... 299/14, 17, 81, 36; 111/7; 172/699; 175/393; 37/193

[56] References Cited

U.S. PATENT DOCUMENTS

| | | | |
|---|---|---|---|
| 1,856,379 | 5/1932 | Fosk | 111/7 |
| 2,598,121 | 5/1952 | Hannibal | 172/699 X |
| 3,231,025 | 1/1966 | Bodine | 111/7 |
| 3,563,324 | 2/1971 | Lauber | 299/81 |
| 3,713,496 | 1/1973 | Codlin | 172/699 |
| 3,747,982 | 7/1973 | Agnew et al. | 299/81 |
| 3,770,322 | 11/1973 | Cobb et al. | 299/14 X |
| 3,778,106 | 12/1973 | Taylor et al. | 299/81 |
| 3,919,951 | 11/1975 | Williams et al. | 111/7 |
| 3,922,017 | 11/1975 | Cobb | 299/70 |

FOREIGN PATENT DOCUMENTS

| | | | |
|---|---|---|---|
| 2210282 | 9/1972 | Fed. Rep. of Germany | 299/81 |

*Primary Examiner*—William F. Pate, III
*Attorney, Agent, or Firm*—Phillips, Moore, Weissenberger, Lempio & Majestic

[57] ABSTRACT

A cooling system for cooling the cutting edge of an impact type ripper tip includes a source of liquid coolant under pressure and conduit means for supplying the coolant to a spray head mounted below and behind the ripper tip in a position to distribute liquid coolant to the lower surface of the tip behind the cutting edge. The spray head is detachably mounted directly behind the ripper tip and projects downward beyond the lower surface of the tip.

21 Claims, 7 Drawing Figures

COOLING SYSTEM FOR ROCK RIPPER TIP

Matter enclosed in heavy brackets [ ] appears in the original patent but forms no part of this reissue specification; matter printed in italics indicates the additions made by reissue.

BACKGROUND OF THE INVENTION

The present invention relates to impact rock rippers and pertains particularly to cooling means for the cutting tip of such rippers.

Mechanical rippers have been used for cutting and ripping relatively soft weathered layered or previously blasted rocks. However, such rippers have not been efficient or useful in ripping hard rocks and pavement or the like.

One of the major problems with the use of such rippers is the high forces that must be induced in rock and similar hard material to cause it to fracture. This necessitates the delivery of very high forces and energy to the face of the rock or other material to be fractured or separated. Mechanical impact rippers, which are capable of delivering very high forces to the tip of such rippers has been recently developed. Rippers of this type are covered, for example, in U.S. Pat. No. 3,770,322, issued Nov. 6, 1973 to Cobb, et al. and entitled "Apparatus for Fracture of Material in Situ with Stored Inertial Energy."

Because of the very high energies delivered to the point of such rippers and the very high speeds of the ripper tip upon the delivery of energy thereto excessive heat and wear to the ripper tip becomes a major problem. The supplying of a coolant to the ripper tip presents a problem of how to effectively supply sufficient coolant to the tip in a reliable manner. The placement passages in the tip itself can weaken it and result in early failure of the tip for that reason. Also, the positioning of the orifices for supplying the liquid to the surface of the tip must be so located to supply the liquid to the proper areas of the surface. Also, such openings must be so located as to avoid the problem of clogging of the passages.

An example of the prior art approach to the supplying of a liquid to a cutting blade, is shown in U.S. Pat. No. 3,685,592, issued Aug. 22, 1972 to Claude M. Frisbee and entitled "Fluid Cushioned Dozer Blade". In that patent a liquid of fluid film is supplied to the front surface of a dozer blade to reduce friction and prevent the adhesion of soil to the moldboard portion of the blade.

Other patents known to the [applicant] *applicants* which are for the purpose of supplying a liquid behind a blade are as follows: U.S. Pat. No. 2,713,299, issued July 19, 1955 to Shager, et al.; U.S. Pat. No. 2,988,026, issued June 3, 1961 to Heckathorn; and U.S. Pat. No. 3,294,181, issued Dec. 27, 1966 to Binder. These three patents are directed to the problem of distributing a liquid fertilizer or the like in a furrow behind an agricultural plow blade. They are not concerned with the problem of cooling the cutting blade or tip.

A system for supplying water to drum-type rotary coal cutters is disclosed by U.S. Pat. No. 3,827,755, issued August 6, 1974 to Allen.

SUMMARY AND OBJECTS OF THE INVENTION

[In accordance with the primary aspect of the present invention, an impact ripping apparatus is provided with cooling means for distributing a flow of coolant to the ripping tip in thin-shaped spray pattern to the undersurface thereof. A spray head for distributing the coolant is located behind and projects downward beyond the lower surface of the ripper tip.]

*In one aspect of the present invention, the cutting tool of an earth cutting apparatus, having a cutting tool terminating forwardly at a cutting edge, is provided with means for spraying and directly impinging pressurized coolant across the width of a bottom surface of the cutting tool and the width of the cutting edge. The means is located between planes having side surfaces of the cutting tool lying therein.*

*In another aspect of this invention, the cutting apparatus is employed on an impact rock ripping machine and includes a support member having the cutting tool or tip mounted thereon.*

*In another aspect of this invention, the support member comprises a shank having an adapter mounting the tip on the shank and a spray head mounted beneath the shank.*

It is a primary object of the present invention to provide cooling means for a ripper tip for overcoming the above problems of the prior art.

Another object of the present invention is to provide cooling apparatus for distributing a liquid coolant to the surface of a rock ripping tip to cool the tip thereof.

A further object of the present invention is to provide a cooling apparatus for supplying a coolant under pressure to the surface of a ripper tip in a fan-like pattern to the underside thereof.

BRIEF DESCRIPTION OF THE DRAWINGS

The [abobve] *above* and other objects and advantages of the present invention will become apparent from the following description when read in conjunction with the drawings wherein.

DETAILED DESCRIPTION OF THE PREFERRED EMBODIMENT

Figure 1:
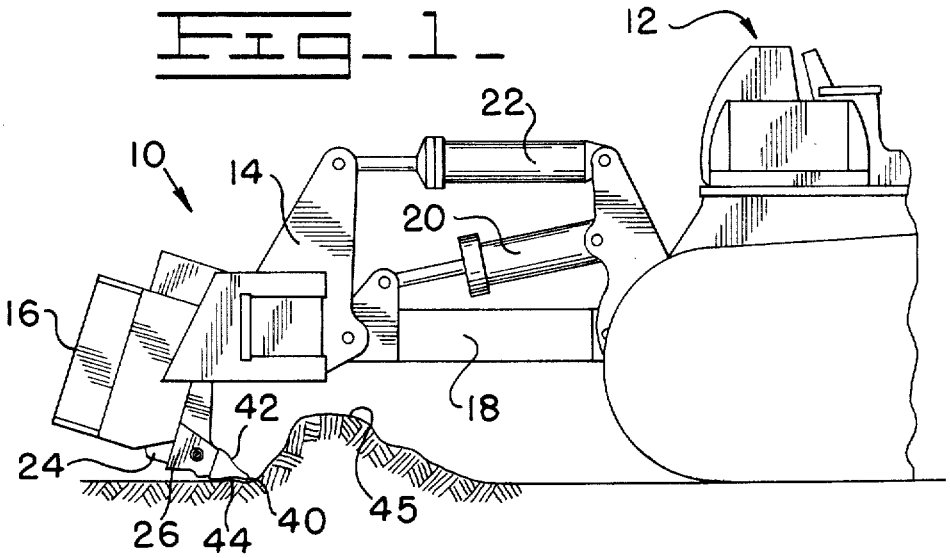
FIG. 1 is a side elevational view of an impact ripper embodying the present invention.

Turning now to the drawings and particularly to FIG. 1 there is illustrated an impact-type rock ripper generally designated by the numeral 10 connected to and towed behind a vehicle such as a crawler-type tractor indicated generally by the numeral 12. The impact rock ripper 10 is of the type such as that disclosed in U.S. Pat. No. 3,770,322, for example, and includes a frame 14 supporting a housing 16 in which an impact mechanism is housed. The impact mechanism delivers high impact blows to the shank of the ripper, with the energy being delivered by the tip to the rack. The apparatus is supported from the tractor 12 by suitable linkage arrangement including a link 18 and a pair of lift and tilt cylinders 20 and 22 controlled in the usual manner by the operator for controlling the depth and angle of attack of a ripper tip.

The impact apparatus, contained within the housing 16, includes a mechanical impact developing apparatus such as that disclosed in the above-mentioned patent for developing and delivering impact blows to a ripper shank 24 which is mounted to the housing and frame assembly in a manner to permit to and fro motion. The shank 24 in the usual embodiment includes a detachably mounted adapter and shin guard assembly 26 including a rearwardly directed socket 28 for receiving a forward extending member 30 of the shank 24. A pin 32 extending through a transverse bore through the spocket and plug member 30 retains the adapter 26 on the shank. The adapter includes a forwardly directed socket 34 for receiving a rearward extension 36 of a substantially wedged-shaped ripper tip 38.

The ripper tip 38 is detachably mounted to the ripper shank 24 by means of the adapter 26 for ease of replacement. This arrangement permits the ripper [tips] *tip* to take the wear and be replaced upon excessive wear without undue wear and a necessity of replacing the shank 24. The tip 38 itself is a substantially wedge shape having a relatively sharp forward cutting edge 40 formed by the converging of *top or* upper and *bottom or* lower surfaces 42 and 44 which may be substantially [plane] *planar* but are preferably slighty curved.

Turning back [, back,] for a moment [,] to FIG. 1 it will be appreciated that the point 40 of the tip 38 will extend downward toward the earth formation in a preferred arrangement for engagement with the face of a hard rock formation 45. It will also be appreciated that debris, rock and materials cut from the formation will normally move up the face 42 and be pushed aside as the ripper tip and shank progresses forward through a formation. For this reason, it is difficult to position a coolant distributing nozzle or head to distribute coolant along the face 42 without providing passages [witin] *within* the tip 38 itself. The disadvantage of providing [pssages] *passages* within the tip 38 is the problem of weakening the tip thus, resulting in early failure of the tip for that reason. Another problem of so providing such nozzle would be that the material flowing along the upper surface thereof would tend to clog the nozzle and pevent the distribution of coolant thereto. In the normal arrangement, for cutting, the lower face *or bottom surface* 44 would normally be slightly tilted downward such that the point 40 would be slightly below the surface thus eliminating drag of the surface 44 across the face of the formation.

The applicants have discovered this to be an ideal location for the distributor head for distributing a flow of coolant across the underside 44 of the tip 38 for the purpose of cooling the entire tip. In this location, the stream of fluid across the surface of the tip encounters the least amount of interference from debris and the like from movement of the tip through an earth formation. It was also discovered that an ideal location for the distributing nozzle is closely adjacent and directly behind the ripper tip itself within the support structure of the shank or the adapter. Where an adapter is used, such as in the illustrated embodiment, the spray head should be located within the adapter as closely adjacent the tip as possible. A suitable coolant, such as water, oil or an emulsion thereof, is supplied under pressure to the ripper tip 38 by suitable coolant supply system.

This system in accordance with the present invention includes a suitable tank or reservoir 46 for containing a suitable supply of coolant from which the coolant is drawn by means of a pump 48 and supplied under pressure by suitable conduit means 50 to a selector valve 52. The selector valve 52 is operative to direct the fluid either back along a return line 54 to the tank 46 or along a supply line 56 to a suitable passage 58 within the shank 24 for supply along a passage 60 in the adapter 26 to the spray head or nozzles 62. Suitable coupling means with suitable sealing means 64 is provided at the juncture of the adapter 26 with the shank 24. The spray head itself is of a generally semi-frusto conical configuration having a sloping wall 66 and a semi-cylindrical forward or front wall 68 in which is formed a plurality of orifices 70 so arranged and located to distribute coolant across the face of tip 38 in a fan-like pattern extending up to just behind the front cutting edge 40. The spray head or distributing head 62 includes a stepped bore 72 extending from the face thereof upward toward the top and communicating with the nozzles or orifices 70. The open bottom communicates the passage 60 when in position.

The spray head 62 is mounted within a slot formed in the lower forward surface of the adapter 26. This slot is of a generally semi-frusto conical in shape with an open front opening toward the tip 40. This slot is formed at the juncture of the adapter 26 and the ripper tip 38. The slot begins at face 76. This slot generally designated by the numeral 74 begins at the front face 76 of the adapter 26 and extends backward therefrom with sloping walls 78 defining the generally semi-frusto conical configuration for receiving and engaging the similarly shaped walls 66 of the spray head 62. The slot 74 has an open front to permit exposure of the face 68 of the spray head 62. This slot 74 is formed in a downwardly projecting lower face 88 of the adapter 26,. This face 88 extends downward below the surface or face 44 of the tip 38. This mounts the spray head 62 above the face or surface 44 to permit the spray nozzles 70 to direct a spray coolant across the face 44. The spary nozzle 62 is detachably mounted within the slot 74 and in such a manner that once inserted the mounting of the tip 38 retains the spray head in place by means of shoulder 80. Suitable seal means comprising a seal ring 82 mounted within a radial groove or slot 84 of the bore 72 seals the bore 72 against the lower surface 86 of slot 74 and thereby seals communication of the bore 60 with the bore 72 and communication thereof with the orifices 70.

Figure 5:
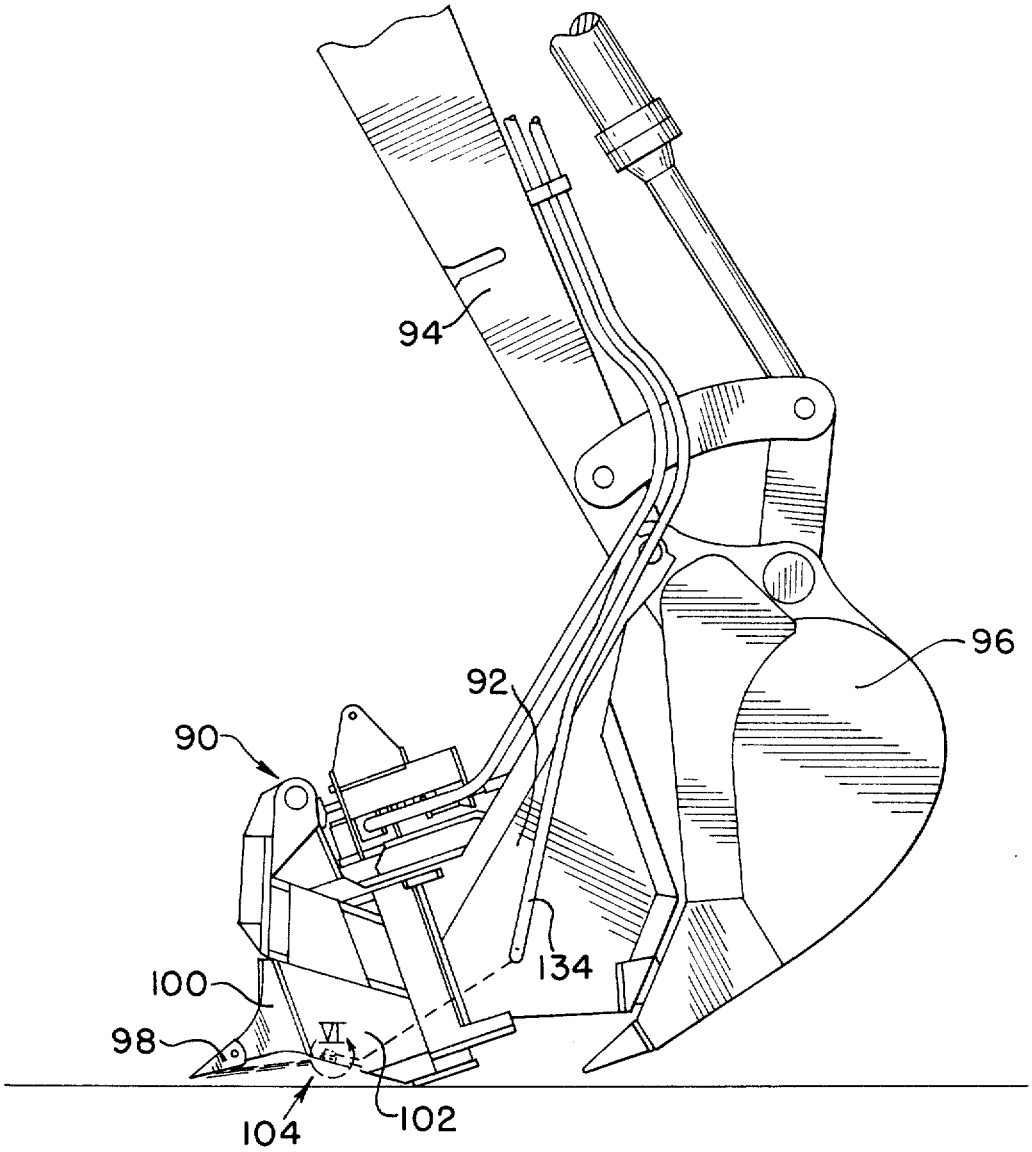
FIG. 5 is a side elevational view of an alternate embodiment of the invention.

Referring to FIG. 5 a rock ripper of the type mounted on an excavator is shown in operative position. Rock rippers or breakers of this type are more fully described in U.S. Pat. No. 3,868,145, issued Aug. 23, 1973, to Cobb, et al. and U.S. Pat. No. 3,922,017, issued Dec. 16, 1974, to Cobb.

Figure 2:
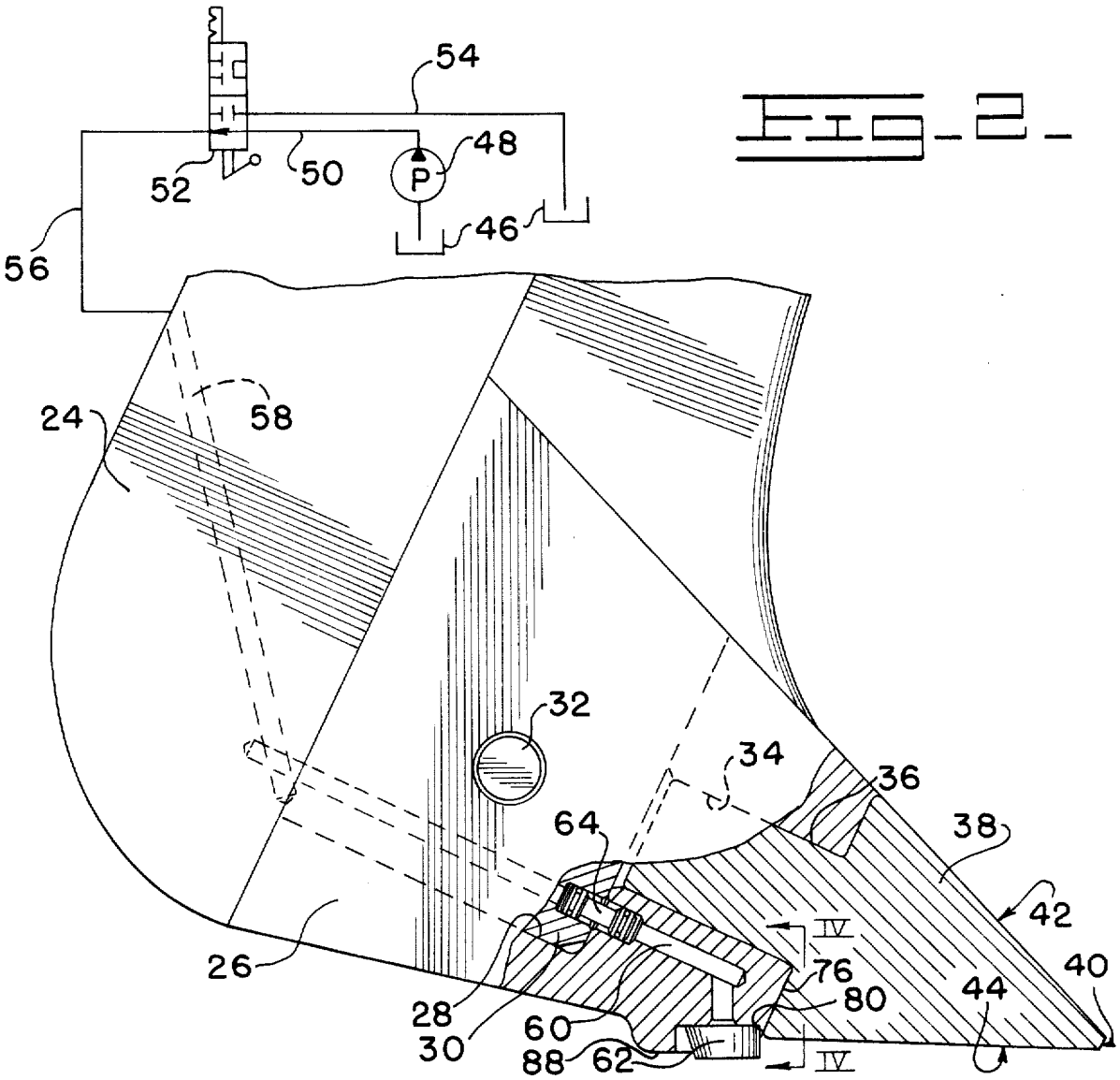
FIG. 2 is an enlarged view of a ripper tip with portions broken away to show details of the present invention.
Figure 3:
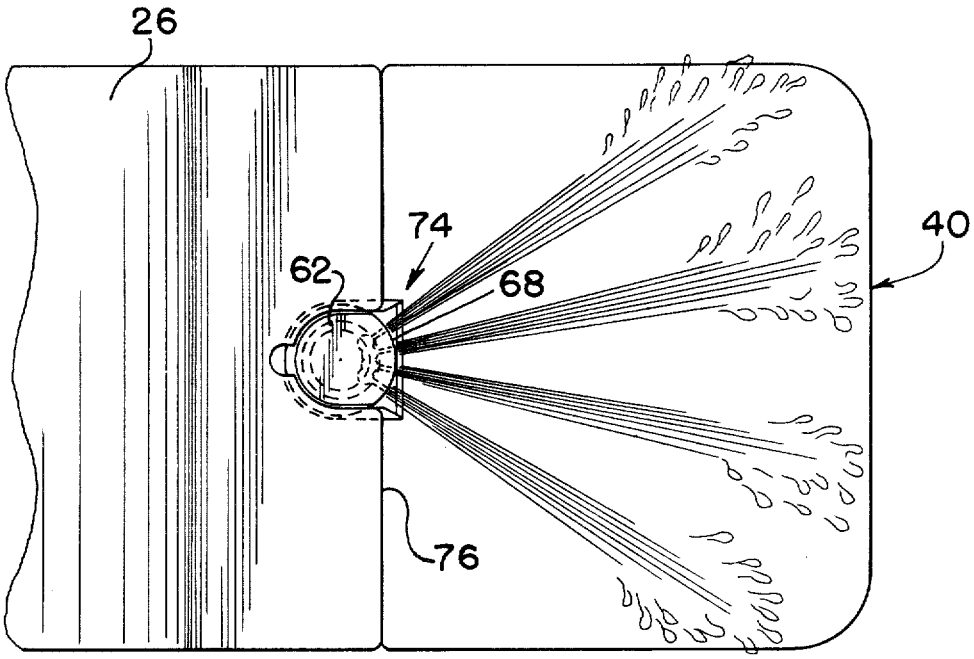
FIG. 3 is a bottom plan view of the ripper tip of FIG. 2.
Figure 4:
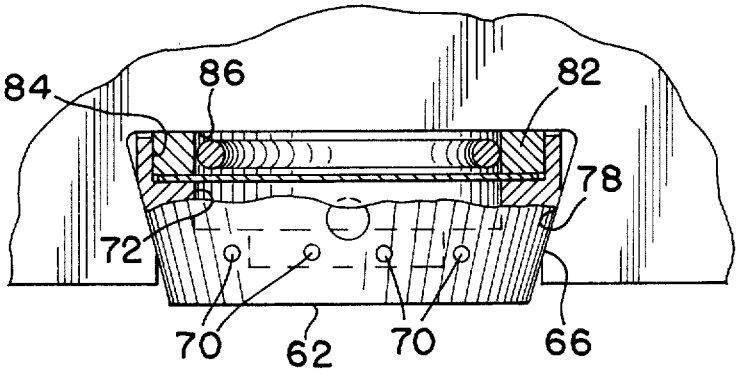
FIG. 4 is a view taken generally along lines IV—IV of FIG. 2.

The cooling means in this embodiment includes a fluid or coolant supply system as shown in FIG. 2 for [supplyibg] *supplying* the coolant to the ripper tip. The impact ripper or breaker mechanism generally designated by the numeral 90 is supported by suitable support or mounting frame means 92 from a jib 94 and bracket 96 of a hydraulic excavator or backhoe. A ripper tip 98 is mounted on a movable shank 100 to which is delivered impact blows by a suitable impact mechanism. A rock guard 102 is mounted just behind the shank 100 and shields portions of the impact mechanism from rocks.

The cooling system of this embodiment includes a spray head indicated generally by the numeral 104 mounted in a suitable position such as on rock guard 102 for directing a stream of cooling fluid to the [underride] *underside or bottom surface* of the tip 98.

Figure 6:
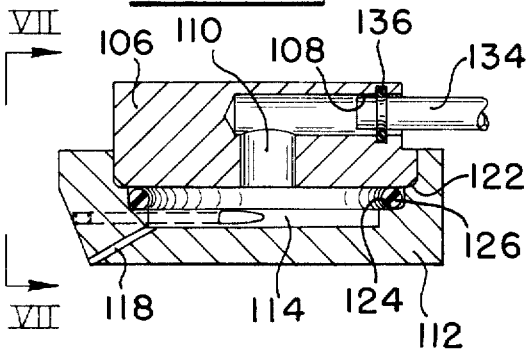
FIG. 6 is a detailed view in section of the spray head taken from the vicinity of VI of FIG. 5; and, FIG. 7 is a front elevational view of the spray head of FIG. 6.
Figure 7:
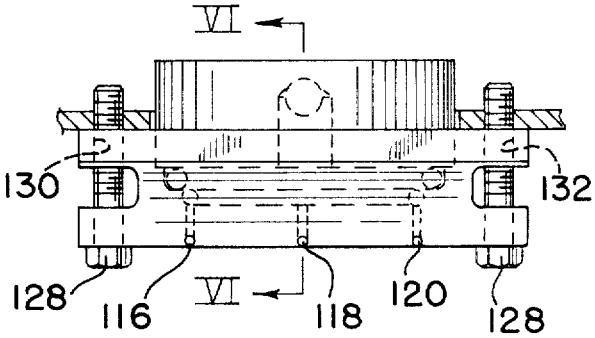

The spray head as best seen in FIGS. 6 and 7 comprises a substantially cylindrical body 106 having an inlet passageway 108 communicating with a central chamber or passageway 110. A cap 112 fits over one end of the housing 106 and includes a central chamber or passageway 114 in communication with the passageway 110. A plurality of spray nozzles or outlets 116, 118 and 120 extend at an angle from central chamber 114 for communicating from the chamber and to the lower side of tip 98. Any number of the nozzles may be provided as needed.

The chamber 114 is formed by a series of bores of a decreasing diameter forming a stepped bore and defining a first annular shoulder 122 engaging the face of body member 106, a second shoulder 124 engaging an annular seal 126 for sealing the chambers 110 and 114 against leakage of fluid.

The spray head is held in place such as by a pair of bolts 128 which extend through bores 130 and 132 in opposite sides of the cap 112. Fluid introduced into the spray head by way of inlet 108 flows by way of chambers 110 and 114 to the outlets 116–120.

A cooling fluid such as water is communicated from a suitable source by way of a suitable conduit such as a flexible line 134. The line 134 is connected in a suitable manner to inlet 108 and sealed thereto such as by a seal 136.

From the above description, it is seen that we have provided a rock ripper of the impact type with suitable cooling means for the distribution of a flow of coolant to the ripper in a fan-like pattern to maintain cooling thereof. *Spray heads 62 and 104 thus provide means for spraying and directly impinging pressurized coolant across the full widths of the bottom surfaces and cutting edges of the respective cutting tools or ripper tips. The cutting edge of each standard tip terminates forwardly at the juncture of the pair of side surfaces, the top surface, and the bottom surface thereof. The side surfaces lie in a pair of laterally spaced imaginary planes and the spray head is located between such planes.*

While the present invention has been described with respect to specific embodiment, it is to be understood that numerous changes and modifications may be made therein without departing from the spirit and scope of the invention as defined in the appended claims.

What is claimed is:

1. In an impact rock ripping machine having an elongated and downwardly extending ripping shank with a forwardly extending [rip] *tip* mounted on said machine for receiving intermittent impact blows for driving the shank and tip in a forward direction at intermittent high speed intervals the improvement comprising:

cooling means for distributing a flow of coolant to said tip for controlling the temperature thereof comprising a spray head mounted beneath said shank and disposed intermediate lateral sides thereof and behind said tip and having a plurality of spray openings positioned thereon to direct a spray pattern of coolant to an underside of said tip and fully thereacross;

an adapter having a first socket receiving a forwardly extending projection of said shank in mounting relationship therein and a second socket having said tip detachably mounted therein; and spray head mounting means on said adapter mounting said spray head thereon, adjacent to said tip.

2. The machine of claim 1 wherein said cooling means further comprises:

a pressurized source of fluidized coolant; and means for communicating coolant from said source to said spray head.

3. The machine of claim 1 wherein said spray head mounting means comprises:

a slot having sloping sidewalls formed in the lower forward edge of said adapter receiving said spray head therebetween;

said spray head having sloping side walls engaging corresponding the sloping side walls of said slot for being retained in position thereby.

4. The machine of claim 3 wherein:

said spray head projects downward beyond the lower surface of said ripper tip.

5. The machine of claim 3 wherein said slot is semi-frusto conical in shape with an open front opening toward said tip; and, said spray head is semi-frusto conical in configuration with a semi-cylindrical front face.

6. The machine of claim 5 wherein said openings are formed in said semi-cylindrical front face; and said face is exposed at the open front of said slot and extends beyond the surface of said tip.

7. The machine of claim 1 wherein:

said machine includes a housing supporting said ripping shank for movement relative thereto[; and, said spray head is mounted on said housing].

8. The machine of claim 1 wherein said spray head further comprises:

a first cylindrial body having an inlet passage communicating with a central chamber; and, a cap having said plurality of openings formed therein and means communicating said openings with said central chamber.

9. The machine of claim 1 wherein said tip extends laterally entirely across a front side of said adapter.

10. In an impact rock ripping machine, a ripping shank, an adapter mounted on a forward end of said shank, A tip detachably mounted on a forward end of said [adapted] *adapter*, and cooling means for distributing a flow of coolant to said tip for controlling the temperature thereof comprising a pressurized source of coolant, a spray head mounted beneath said shank and [havng] *having* a plurality of openings positioned thereon for directing [coolabt] *coolant* forwardly and across an underside of said tip, means for communicating coolant from said source to said openings, and spray head mounting means comprising a slot having sloping sidewalls formed in said adapter and sloping sidewalls formed on said spray head and engaging the sloping sidewalls formed in said adapter for being retained in position thereby.

*11. In an earth cutting apparatus having a cutting tool, said cutting tool having a cutting edge terminating forwardly at the juncture of a pair of side surfaces lying in a pair of laterally spaced planes, a top surface, and a bottom*

*surface of predetermined width and length, the improvement comprising:*

*means for spraying and directly impinging pressurized coolant across the full width of said bottom surface and the full width of said cutting edge, said bottom surface being defined as that portion of the tool in contact with the unsevered earth during a cutting operation of said apparatus and said means located between the planes having said side surfaces lying therein.*

*12. The apparatus of claim 11 said means includes a single spray head having a plurality of openings positioned thereon.*

*13. The apparatus of claim 12 wherein said spray head is mounted intermediate the width of said tool.*

*14. The apparatus of claim 12 further including a guard member disposed rearwardly of said tool and wherein said spray head is mounted on said guard member.*

*15. In an impact rock ripping machine*

*a support member having a predetermined width and mounted on said machine,*

*tip means mounted forwardly of said support member for penetrating hard materials and having forwardly converging top and bottom surfaces and a pair of side surfaces lying in a pair of laterally spaced planes terminating at a narrow cutting edge extending across the full width of said tip means, said cutting edge being at least as wide as the width of said support member, and*

*cooling means mounted directly rearwardly of said cutting edge and fully exposed to said bottom surface for spraying and directly impinging pressurized coolant in a fanlike pattern across the full width of said bottom surface in the plane thereof and directly across the full width of said cutting edge, said cooling means located between the planes having said side surfaces lying therein.*

*16. The machine of claim 15 wherein said cooling means includes a single spray head having a plurality of openings positioned thereon for directing coolant towards said cutting edge.*

*17. The machine of claim 16 wherein said spray head is mounted intermediate the width of said tip means.*

*18. The machine of claim 16 wherein said support member includes an adapter having said tip means detachably mounted thereon and wherein said spray head is mounted on said adapter.*

*19. The machine of claim 16 wherein said support member includes a rock guard disposed rearwardly of said tip means and wherein said spray head is mounted on said rock guard.*

*20. The apparatus of claim 11 further including means for moving said cutting tool horizontally to engage said cutting edge in cutting contact and said bottom surface in contact with said unsevered earth.*

*21. The machine of claim 15 further including means for moving said shank and said tip means horizontally to engage said cutting edge in cutting contact and said bottom surface in contact with unsevered earth.*

* * * * *